Nov. 25, 1952     O. B. SKIFTE     2,619,379
SPRAYING MACHINE
Filed Sept. 10, 1948     2 SHEETS—SHEET 1
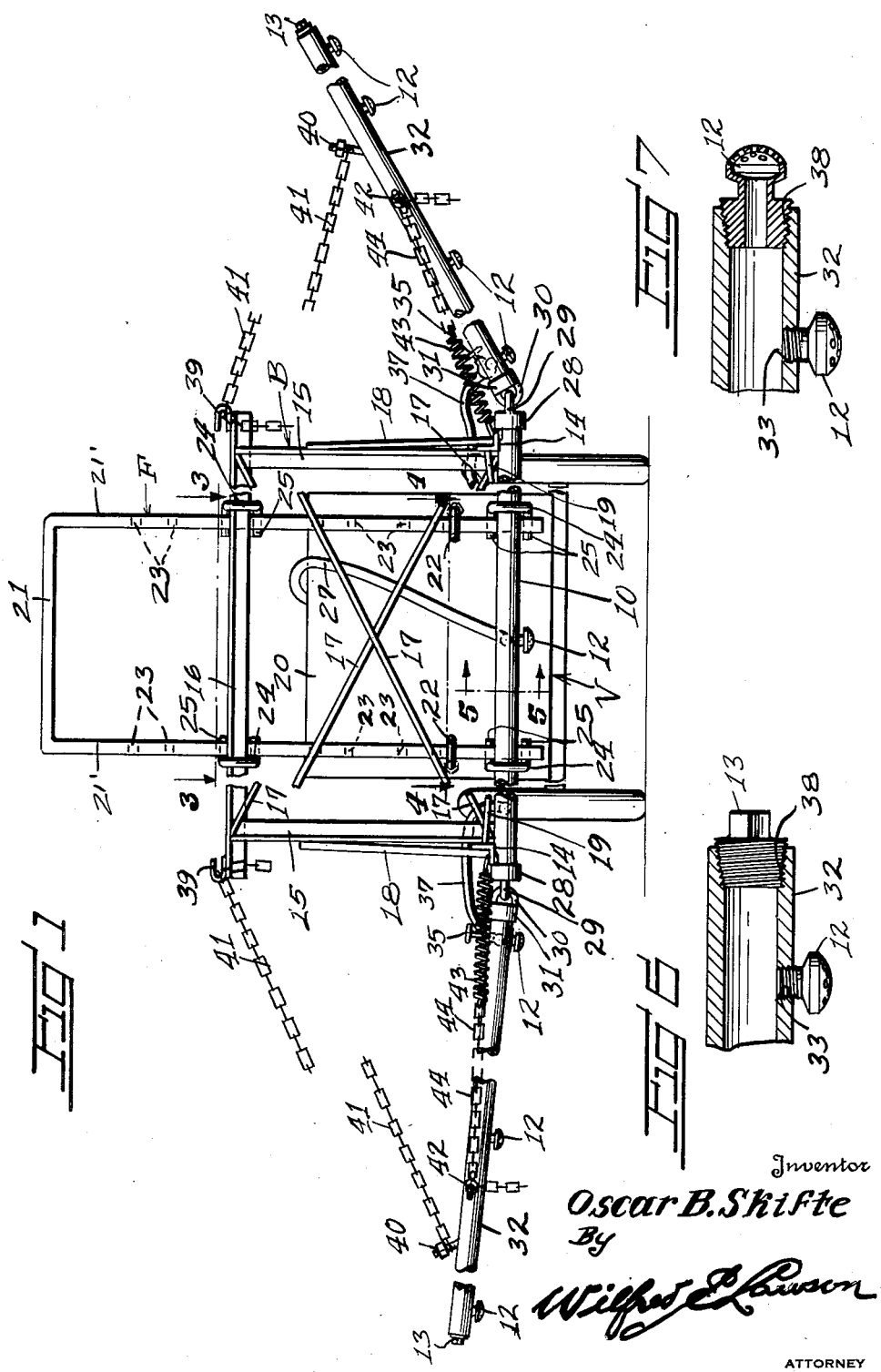
Inventor
Oscar B. Skifte
By
Wilfred E. Lawson
ATTORNEY

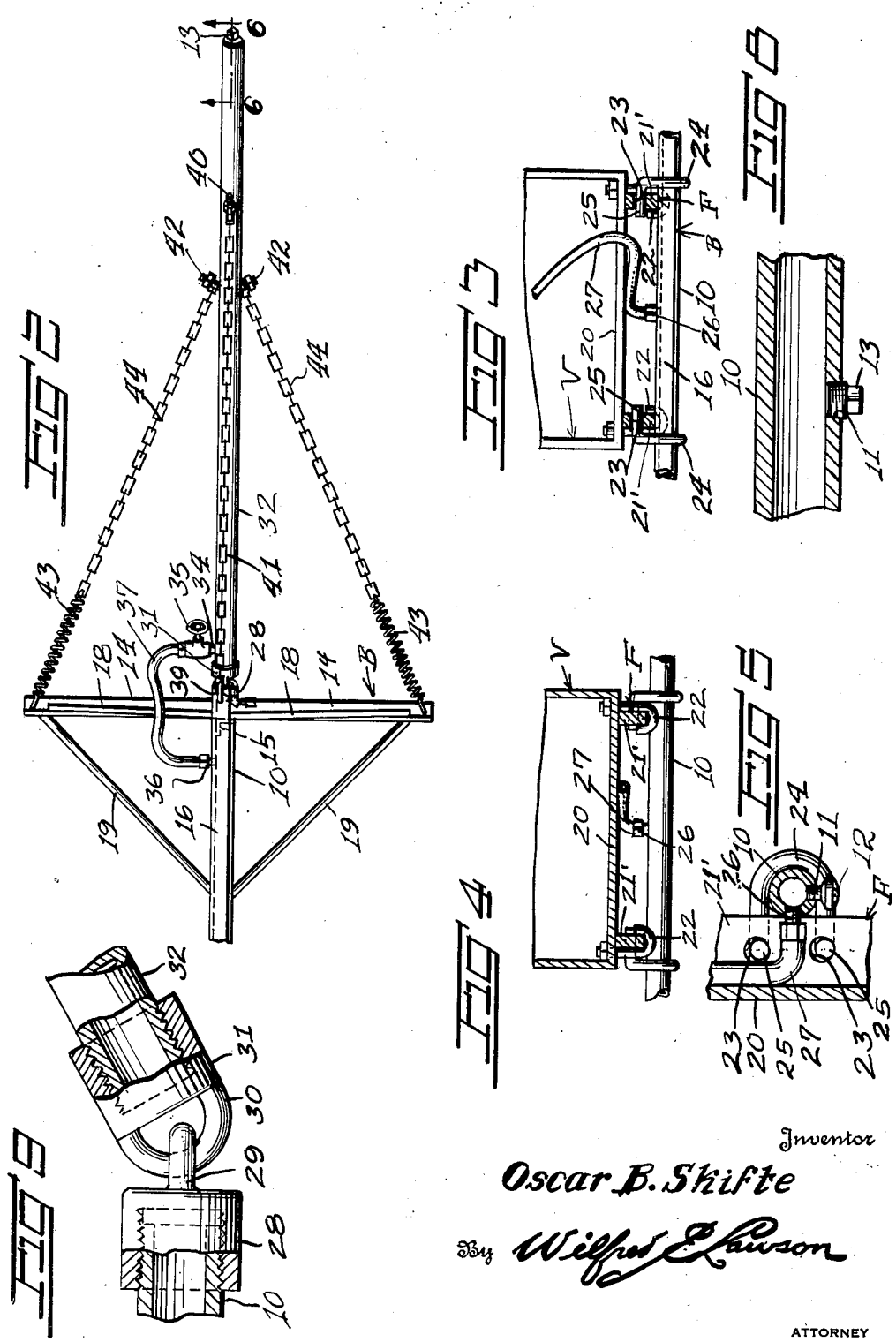

Patented Nov. 25, 1952

2,619,379

UNITED STATES PATENT OFFICE 2,619,379

SPRAYING MACHINE

Oscar B. Skifte, Clear Lake, S. Dak.

Application September 10, 1948, Serial No. 48,715

2 Claims. (Cl. 299—39)

The invention relates to spraying machines and more particularly to spraying attachments for such machines.

The primary object of the invention is to provide a spraying attachment comprising a pipe, to the end portions of which spraying booms are adjustably secured.

Another object of the invention is to provide a spraying attachment the pipe of which is equipped at its end portions with spraying booms adapted to swing backward upon encountering an obstruction and to return automatically into normal position with respect to the spraying pipe upon passing said obstruction.

A further object of the invention is to provide a spraying attachment of the character indicated above adapted to be mounted adjustably onto any trailer, cart, truck or tractor equipped with the necessary tank for spraying fluid, a pump for forcing the fluid into the spraying pipe, etc.

Other objects of the invention not specifically mentioned may appear in the following specification describing it with reference to the accompanying drawings illustrating a preferred embodiment of the invention. It is, however, to be understood that the invention is not to be limited or restricted to the exact construction, combination and arrangement of parts described in the specification and shown in the drawings, but that such changes and modifications can be made, which fall within the scope of the claims appended hereto and especially pointing out the novel features of the invention.

Throughout the specification and in the several figures of the accompanying drawings similar parts are indicated by similar reference characters and Figure 1 is a fragmentary view in elevation of a spraying attachment in accordance with the invention, mounted on a suitable vehicle;

Figure 2 is a fragmentary view in top plan of a spraying attachment in accordance with the invention;

Figure 3 is a view in section taken on the line 3—3 of Figure 1;

Figure 4 is a view in section taken on the line 4—4 of Figure 1;

Figure 5 is a view in section taken on the line 5—5 of Figure 1;

Figure 6 is a view in section taken on the line 6—6 of Figure 2;

Figure 7 is a view similar to Figure 6, the screw plug shown in Figure 6 being replaced by a spray nozzle;

Figure 8 is a fragmentary view in section of a spraying pipe taken on a vertical diametrical plane; and Figure 9 is a view in elevation, partly shown in section, of the hinge connection between a spraying pipe and a spraying boom.

The spraying attachment embodied herein comprises a spraying pipe 10 provided over its entire length with a plurality of equidistantly spaced tapped holes 11 adapted to receive exchangeably either spray nozzles 12 or plugs 13. Adjacent to each end of the spraying pipe 10 an adjusting angle 14 is welded intermediate of its end to the pipe, so that the angles extend at right angles to the spraying pipe and the upward extending legs of the angles are located at the inner side of said angles. The tapped holes 11 are located diametrically opposite to the angles. An upright angle 15 is welded onto the central portion of each of the angles 14 and to the pipe 10, from which it extends upwardly at right angles. Onto the upper end portions of the two uprights 15 another angle 16 is secured extending slightly beyond the uprights 15. In this manner a bracket frame B for the sprayer pipe is formed by the angles 14, 15 and 16 and this bracket frame is reinforced by cross braces 17 formed by bars extending diagonally between the junctions of the top frame angle 16 and the uprights 15 and the junctions of said uprights and the adjusting angles 14. Additional reinforcing bars 18 are secured with their upper end portions to each upright 15 below the upper frame angle 16 and with their lower end portions to each of the adjusting angles 14 adjacent to each of the ends of said angles. Each of four stiffener members 19 is welded with one of its end surfaces onto one of the adjusting angles 14 adjacent to one of its ends and the other end surface of each stiffener member 19 is welded onto the sprayer pipe 10 so that each stiffener member forms an angle of approximately 30° with the adjusting angle 14.

To an end wall 20 of an appropriate vehicle V such as a trailer, truck, tractor or the like an adjusting frame F is secured. The frame comprises a top member 21 and two side members 21' extending at right angles to the top member. The members of the adjusting frame have rectangular cross sections. A plurality of J-bolts 22 are secured to the end wall 20 of the vehicle V and secure the adjusting frame F firmly to the wall.

In each side member 21 of the adjusting frame F an equal number of pairs of holes 23 is provided and the two holes of each pair are located longside of each other at the same level. Two pairs of U-shackles 24 are provided and the shanks 25 of each U-shackle are bent to extend at right angles from the U-shaped shackle body and are adapted to enter selectively the holes 23 of one pair of said holes.

The sprayer pipe 10 and its bracket frame B are secured on the vehicle V by sliding one pair of U-shackles 24 onto the spraying pipe 10 and another pair on the top frame angle 16 of the bracket frame B, so that the shanks are arranged horizontally. Then the shanks 25 are inserted in the holes 23 located at the selected level. In this manner the spraying pipe 10 can be arranged selectively at a higher or lower level.

In the vehicle V, indicated in Figure 1 as a cart or the like, a container of spraying fluid, a pump and so forth are located. These parts do not form any portion of the present invention and are therefore neither shown nor described.

The sprayer pipe 10 is provided intermediate its ends with a nipple 26 to which a flexible pipe 27, a hose or the like is connected with one of its ends. The other end (not shown) of said flexible pipe is connected with the ejector end of the pump.

Each end of the spray pipe 10 is closed by means of a screw cap 28 and on each cap one half of a chain link or the like is welded forming a half shackle or a curved hinge member 29. A similar hinge member 30 is inserted into the hinge members 29 and a screw cap 31 is welded onto each hinge member 30. Into each screw cap 31 a pipe is screwed forming a spray boom 32. A plurality of tapped holes 33 are provided at equal distances over the entire length of each spray boom and into each of these holes a spray nozzle 12 or a plug 13 can be selectively secured. Adjacent to its inner end each spraying boom is provided with a nipple 34 on which a shut-off valve 35 is mounted. A nipple 36 is arranged on the spraying pipe adjacent to each end thereof and a flexible pipe or hose 37 connects the valves 35 and the nipples 36 located adjacent to each other. The outer or free end portion of each spraying boom 32 is tapped as at 38 and in each of these end portions a spray nozzle 12 or a plug 13 may be threadedly secured.

On each end portion of the top frame angle 16 a hook 39 is secured and a bolt or stud 40 is welded onto each spraying boom intermediate its ends and extends upwardly and outwardly therefrom. A chain 41 or the like is attached with one of its ends to each of the bolts 40 and is adapted to engage the nearest hook 39 selectively with one of its links, whereby the two spraying booms 32 can be raised or lowered independently of each other and can be arranged in vertical direction at any desired angle with respect to the spraying pipe 10. On each spraying boom 32 two bolts 42 are welded intermediate the ends of the boom, so that the bolts on each boom are located diametrically opposite to each other and extend outwardly and laterally therefrom.

Adjacent each end of each adjusting angle 14 one end portion of a helical spring 43 is secured in any conventional manner and to the other end portion of each spring a chain 44 is attached, which is adapted to engage the nearest bolt 42 selectively with one of its links, whereby the two spray booms can be adjusted independently of each other in horizontal direction at any desired angle to the spraying pipe. In addition to that each spraying boom is adapted to swing out of the way, when it encounters any obstacle and will return under the influence of the springs 44 to the adjusted position.

The above description shows clearly that the spraying booms can be raised for transportation or for spraying on side hills or over fences and the like; that the spraying attachemnt is adapted to be attached to any suitable vehicle equipped with fluid container and necessary pumping machinery and that the spraying booms are connected to the spraying pipe by hinge means permitting a universal adjustment of said booms with respect to the pipe.

I claim:

1. In a transportable spraying machine, including the wheeled chassis thereof, an elongated vertically disposed inverted U-shaped frame mounted transversely on said chassis, a vertically disposed inverted U-shaped bracket frame adjustably supported on the forward side of the first frame in parallel relation with respect thereto, said bracket frame being of a greater width and a lesser height than the first frame and centered with respect to the latter so that its leg portions are spaced equally outward from the leg portions of the first frame, a transversely disposed spray pipe fixedly mounted on the lower ends of the legs of said bracket frame, a laterally extending spray boom in the form of a length of pipe at each side of said machine, the ends of said spray pipe and said booms being closed, a universal connection between the inner ends of said booms and the adjacent ends of said spray pipe, a flexible tubular element connecting said spray pipe at its center with the spray supply of the machine, other flexible tubular elements spanning said universal connections and connecting with the adjacent ends of said spray pipe and said booms, said spray pipe and said booms each being provided with downwardly directed spaced tapped openings to receive spray nozzles or closure plugs, and a member connecting the outer end portion of each of said booms with the upper end of the near side of said bracket frame to support the booms at a desired vertically angled height with respect to the ground.

2. The invention as defined in claim 1, with a horizontally disposed angle bar supported at its center on each end of said spray pipe in right angular relation with respect thereto and outwardly from the adjacent of the legs of said bracket frame, a pair of converging coil springs having one of their ends connected with the ends of each of said bars, and flexible elements adjustably connecting the other ends of said springs to said booms intermediate the ends thereof.

OSCAR B. SKIFTE.

REFERENCES CITED

The following references are of record in the file of this patent:

UNITED STATES PATENTS

| Number | Name | Date |
|---|---|---|
| 604,479 | Nichol | May 24, 1898 |
| 926,791 | Watson | July 6, 1909 |
| 999,676 | Schoelies | Aug. 1, 1911 |
| 1,633,294 | Stubenberg | June 21, 1927 |
| 2,169,948 | Gallupe | Aug. 15, 1939 |
| 2,221,433 | Pitner | Nov. 12, 1940 |
| 2,305,913 | Troyer | Dec. 22, 1942 |
| 2,481,733 | Elias | Sept. 13, 1949 |
| 2,532,996 | Clark | Dec. 5, 1950 |
| 2,541,417 | Hartsock | Feb. 13, 1951 |